United States Patent [19]

Watanabe

[11] Patent Number: 5,528,729
[45] Date of Patent: Jun. 18, 1996

[54] NEURAL NETWORK LEARNING APPARATUS AND LEARNING METHOD

[75] Inventor: Sumio Watanabe, Yokohama, Japan

[73] Assignee: Ricoh Company, Ltd., Tokyo, Japan

[21] Appl. No.: 898,202

[22] Filed: Jun. 11, 1992

[30] Foreign Application Priority Data

Jun. 12, 1991 [JP] Japan .................................. 3-140263
Aug. 30, 1991 [JP] Japan .................................. 3-219644
Feb. 3, 1992 [JP] Japan .................................. 4-47525

[51] Int. Cl.$^6$ .................................................. G06F 15/18
[52] U.S. Cl. .................................................. 395/23
[58] Field of Search .......................... 395/20, 21, 23, 395/22

[56] References Cited

U.S. PATENT DOCUMENTS

| | | | |
|---|---|---|---|
| 4,914,603 | 4/1990 | Wood | 395/23 |
| 5,046,020 | 9/1991 | Filkin | 395/23 |
| 5,073,867 | 12/1991 | Murphy et al. | 395/27 |

OTHER PUBLICATIONS

Lo, "Back Estimation for Training Multilayer Perceptrons", Int'l Conf on Acoustics Speech and Signal Proc, May 14–17, 1991, p. 1065–1068 vol. 2.

Hu et al, "Structural Simplification of a Feed Forward Multi–Layer Perceptron Artificial Neural Network", Int'l Conf on Acoustics, Speech and Signal Proc, May 14–17, 1991 pp. 1061–1064 vol. 2.

Hiraiwa et al, "EMG Pattern Analysis and classification by Neural Network" IEEE Int'l Conf on Systems, Man, and Cybernetics, Nov. 14–17, 1989 pp. 1113–1115 vol. 3.

Day et al "A Stochastic Training Technique for Feed–Forward Neural Networks" Int'l Joint Conf on Neurol Networks, Jun. 17–21, 1990 pp. 607–612 vol. 1.

Jones et al "Function Approximation and Time Series Prediction with Neural Networks", Int'l Joint Conf on Neural Networks, Jun. 17–21, 1990 pp. 649–665 vol. 1.

Xue et al "Analyses of the Hidden Units of the Multi–Layer Perceptron and its Application in Acoustic to Articulatory Mapping", Int'l Conf on Acoustics, Speech & Sig Proc, Apr. 3–6, 1990 pp. 869–872 vol. 2.

*Primary Examiner*—Robert W. Downs
*Attorney, Agent, or Firm*—Oblon, Spivak, McClelland, Maier & Neustadt

[57] ABSTRACT

A neural network learning method firstly performs finding a linear operator which satisfies required conditions suited to the function for learning by using linear prediction, where the function characterizes the neural network of the function approximation type, and operating the linear operator on the teaching patterns which approximated by a linear sum of the function, and determining results of the operation, and secondly it performs replacing learning of a neural network with a linear predictive problem according to the operation result firstly obtained by the first, and for determining a solution with respect to the linear predictive problem, and thirdly it performs a determination of weights from the hidden layer to output layer so that an error between output data from the output layer and the teaching patterns is minimized, according to the solution with respect to the linear predictive problem.

33 Claims, 7 Drawing Sheets

NEURAL NETWORK LEARNING APPARATUS AND LEARNING METHOD

BACKGROUND OF THE INVENTION

The present invention relates to a neural network learning apparatus and a learning method, and in particular, relates to a neural network learning apparatus and learning method which can be applied to voice recognition, voice synthesis, character recognition, robot control and stock prediction and the like.

In recent years, there has been much active research performed for the use of neural networks in voice and image recognition, and time system prediction and the like. There have also been various products in which neural networks have been applied. One example is disclosed in WATANABE and YONEYAMA "Method of Ultrasonic Three Dimensional Object Cognition" treatise US90-29 (1990). Favorable results were obtained for the example of a neural network disclosed in this literature referred to above.

The method of learning in such neural networks is known as the back-propagation error learning method (hereinafter termed the BP method) and the following discussion is for a neural network learning method using the BP method.

First, the neural network learning problems are made into equations. A learning problem of a neural network of the three-layer perceptron type is a problem which can be approximated by the linear sum $$f(x) = \sum_{i=1}^{N} a_i \sigma(w_i x + \theta_i) + \epsilon(x) \qquad (1)$$

$a_i$: synapse weight input to the output layer from the hidden layer
  (i=1,2, ... N, N is the number of neurons in the hidden layer)
$w_i$: synapse weight input to the hidden layer from the input layer
$\theta_i$: bias of the hidden layer
$\epsilon(x)$: error
of the monotone increasing function $\sigma(x)$ which is determined beforehand for the given function $f(x)$ which is called the teaching pattern.

More specifically, the learning problem is to use the error function $\epsilon(x)$ as the required reference to determine the synapse weight $a_i$, the bias $\theta_i$, and the synapse weight $w_i$ so that the error with the teaching pattern is minimized. In equation (1), the function $\sigma(w_i x + \theta_i)$ indicates the output value for the i'th unit of the hidden layer. The function $\sigma(x)$ may for example use the sigmoid function $\{1/(1+\exp(-x))\}$.

The method of determining the synapse weight $a_i$ and $w_i$, and the bias $\theta_i$ is by using the BP method and equation (2) to first determine the error function E and then minimise this error function E using the gradient descent method.

$$E = \int_\Omega \left( f(x) - \sum_{i=1}^{N} a_i \sigma(w_i x + \theta_i) \right)^2 dx \qquad (2)$$

The bias is solved by gradient descent method as follows using Error function E.

$\Delta a_i = -\eta \partial E / \partial a_i$ $\Delta w_i = -\eta \partial E / \partial w_i$ $\Delta \theta_i = -\eta \partial E / \partial \theta_i$ The BP method is for correcting repeated errors in the output with respect to the input of the neural network and corrects the parameters of each unit, and the correction equation is used in the gradient descent method with respect to the square error (evaluating function) of the output from the output layer.

In the BP as described above, it is possible to have learning in the hidden layers of the neural network of a multi-layered neural network of three or more layers for which learning has proved difficult to achieve without the BP method so the learning performance of neural networks can be increased.

However, the BP method is for learning by the gradient descent method which begins at a random initial value and so learning requires a large amount of time, and there is the possibility that learning may be deficient if the learning leads to a local minima. Furthermore, the BP method cannot determine what characteristic of the data is being learned and so it is not possible to interpret the learned results. Still furthermore, the role of the hidden layer in the neural network is not clear and so the number of units required in the hidden layer cannot be determined by the results of simulation. Not only this, the learning does not proceed when there is only a small number of units, and there is excessive learning when there are too many units. Also, it is not possible to make predictions since the output with respect to the combinations that could not be given as teaching data is different for each learning.

Because of these problems, there have been many attempts to correct the deficiencies of the BP method. However, all of these methods have not been able to clarify the mathematical nature of a neural network and so effective improvement has not been made. The reason why it has not been possible to clarify the mathematical nature of a neural network is because of the non-linear characteristics of neural networks.

SUMMARY OF THE INVENTION

Therefore, a general object of the present invention is to solve the associated conventional problems and to provide a novel and effective neural network learning apparatus and learning method.

A specific objective of the present invention is to provide an effective neural network learning method which performs frequency analysis of a neural network so that there is return to a linear predictive problem on a frequency axis, and to clarify the nature of a neural network.

Another more specific object of the present invention is to provide a direct solution to neural network learning problems, instead of a repeated solution.

The objectives can be attained by a neural network learning method comprising a first step for finding a linear operator which satisfies required conditions suited to the function for learning by using linear prediction, where the function characterizes a neural network of the function approximation type, and for applying the linear operator to the teaching patterns which are approximated by a linear sum of the function, and determining results of the operation, a second step for replacing learning of a neural network with a linear predictive problem according to the operation result obtained by the step 1, and for determining a solution with respect to the linear predictive problem, and a third step for determining weights from the hidden layer to output layer so that an error between output data from the output layer and the teaching patterns is minimized, according to the solution with respect to the linear predictive problem.

Additional objects, features and advantages of the present invention will become apparent from the following detailed description when read in conjunction with the accompanying drawings.

DESCRIPTION OF THE PREFERRED EMBODIMENTS

The following is a description of preferred embodiments of the present invention, with reference to the appended drawings.

In order to use linear prediction to perform learning when a function is applied to a neural network, the present invention finds a linear operation which satisfies required conditions suitable for the function, and operates on teaching patterns approximated by the linear sum of that function. Because the present invention applies linear operation to the teaching pattern, it is possible to have linear prediction, and for this linear prediction to be used to perform learning.

FIRST EMBODIMENT

Figure 1:
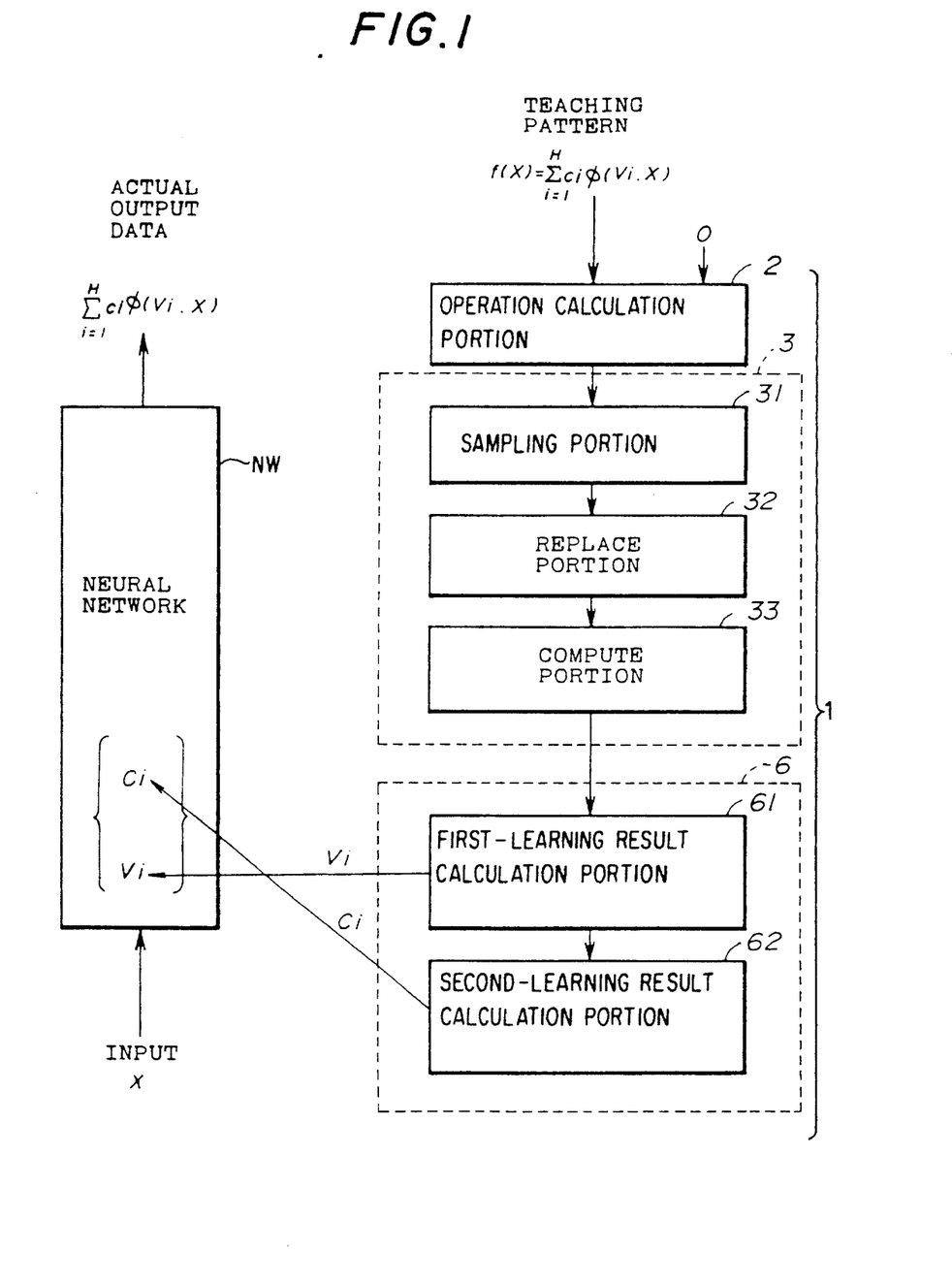
FIG. 1 is a block diagram of an embodiment of the neural network learning apparatus of a first embodiment relating to the present invention.

The description will start with a description of a first embodiment of the present invention. In FIG. 1, the neural network NW is a multi-layer neural network having a hidden layer. When the neural network NW is given the required input x, the learning apparatus 1 learns the parameters which characterize the neural network NW so that the actual output data of the multi-layered neural network NW approximates the teaching patterns f(x) given beforehand.

Figure 2:
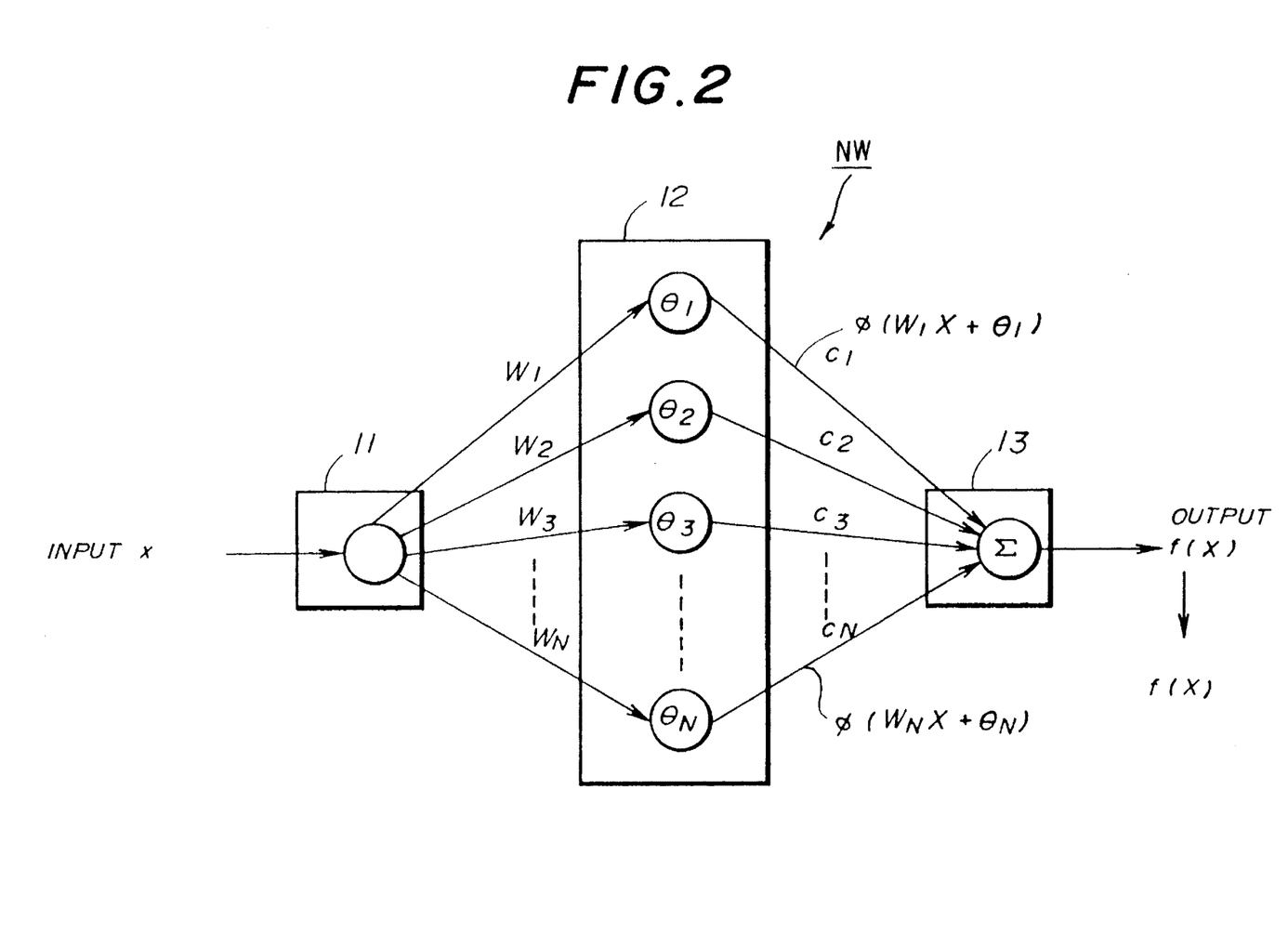
FIG. 2 is a view showing a constitution of a three-layered perceptron neural network.

FIG. 2 is a view showing a constitution of a three-layered perceptron neural network.

In FIG. 2, the neural network NW is comprised from an input layer 11, a hidden layer 12 having N units, and an output layer 13. The synapse weight on the link from the input layer 11 to each unit of the hidden layer 12 is expressed by $w_i$ (where i=1,2, ... N), the bias of each of the units of the hidden layer 12 is expressed as $\theta_i$, and the synapse weight from each of the units of the hidden layer 12 to the output layer 13 is expressed as $c_i$. Accordingly, the actual output data from the output layer 13 is given by the general equation (3).

$$\text{Actual output data} = \sum_{i=1}^{N} c_i \phi(w_i x + \theta_i) \quad (3)$$

Neural network learning determines the synapse weights $c_i$ and $w_i$ and the bias $\theta_i$ so that the actual outputted which is output from the output layer 13 is in agreement with the teaching patterns f(x) given beforehand. In other words, neural network learning determines the parameters $c_i$, $w_i$, and $\theta_i$ so that the approximation function $\phi(w_i x+\theta_i)$ for approximation to the teaching patterns f(x) can be satisfied as far as possible by equation (4) for approximation to the teaching patterns f(x) given beforehand by the linear sum.

$$f(x) = \sum_{i=1}^{N} c_i \phi(w_i x + \theta_i) \quad (4)$$

The right side of the approximation function $\phi(w_i x+\theta_i)$ of equation (4) is generalized to function $\phi(v_i x+\theta_i)$. The function $\phi(v_i x+\theta_i)$ can also be applied to functions other than the function $\phi(w_i x+\theta_i)$ shown for equations (3) and (4). Accordingly, a linear operation is suited to the function $\phi(v_i,x)$ is obtained and suitable learning can be performed using linear prediction.

The linear sum shown in equation (4) is determined for the function $\phi(v_i, x)$ for the teaching patterns f(x) and when this is approximated as in equation (5), it is necessary to have a linear operator O to satisfy equation (6) with respect to the function $\phi(v_i, x)$ Linear prediction is then used to perform learning.

$$f(x) = \sum_{i=1}^{N} c_i \phi(v_i, x) \quad (5)$$

$$O \cdot \phi(v_i, x) = \alpha(v_i) \cdot \beta(x) \cdot \exp\{\gamma(v_i) \cdot x\} \quad (6)$$

The right side of equation (6) has $\alpha(v)$, $\beta(x)$ and $\gamma(v)$ as arbitrary functions but as the result of the linear operator O operating on the function $\phi(v_i,x)$, the right side includes the exponential type function $\exp\{\gamma(v_i) \cdot x\}$ which is linear predictive and therefore is particularly important with respect to linear prediction. In addition, functions such as $\alpha(v), \gamma(x)$ that are multiplied by the exponential type function $$\exp\{\gamma(v_i) \cdot x\}$$

are important for linear prediction since the parameter $v_i$ and the variable x are each in their own independent function.

Accordingly, with the present embodiment, the linear operator O is used to make the approximation function $\phi(v_i,x)$ approximate to the teaching patterns f(x) and satisfy equation (6), and furthermore, determine each of the parameters so that the error of the output data is minimum with respect to the teaching patterns f(x). The apparatus for this is the learning apparatus shown in FIG. 1.

The learning apparatus 1 includes an operation calculation portion 2 which finds the linear operator O (the details will be described) and supplies it to the input teaching patterns f(x), a linear prediction conversion portion 3 which uses the operation results [O·f(x)] which are output from the operation calculation portion 2 and replaces the neural network learning with the linear predictive problem and determines the solution of the linear predictive problem, a first learning result calculation portion 61 which determines the parameter $v_i$ of the approximation function $\phi(v_i,x)$ as a first learning result, and a second learning result calculation portion 62 which uses the teaching patterns f(x) approximated by the approximation function $\phi(v_i,x)$ having the first learning results $v_i$ as the basis for determining the synapse weight $c_i$ (second learning result).

Figure 3:
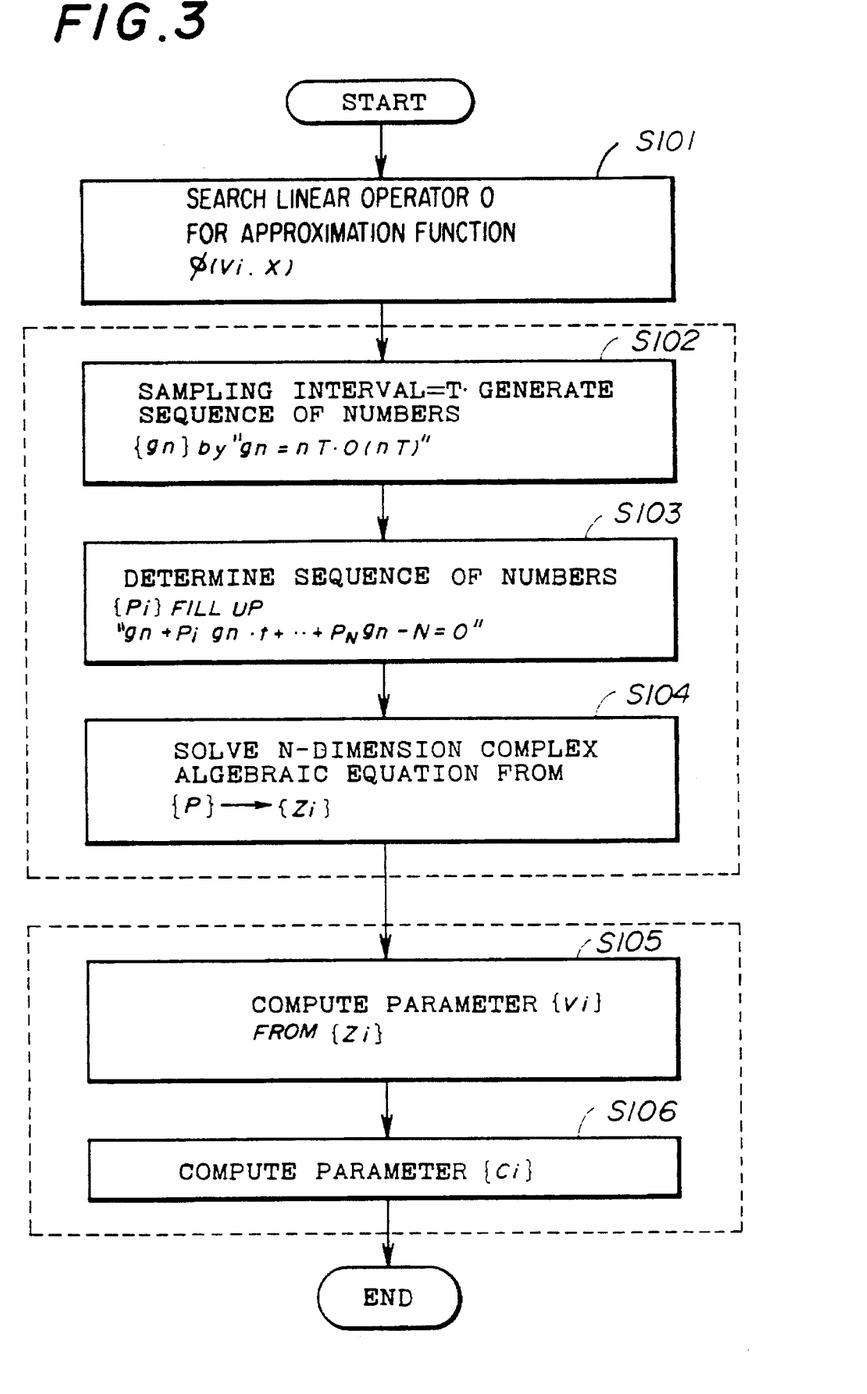
FIG. 3 is a flow chart of a learning operation of a first embodiment of the present invention.

The following is a description of the processing operation of the learning apparatus 1 having the constitution described above, with reference to FIG. 3. FIG. 3 is a flow chart of learning operation of a first embodiment of the present invention.

STEP 101: The operation calculation portion 2 finds a linear operator O which satisfies equation (6), and with respect to the given approximation function $\phi$ ($v_i$,x) by the second learning results calculation portion 62, and operates this linear operator O with respect to the teaching patterns f(x) and determines the operation results O·f(x)(≡O(k)).

STEP 102: A sampling portion 31 of the linear prediction conversion portion 3 determines a suitable sampling interval T and samples the operation results O·f(x) determined in STEP 101, and a replace portion 32 generates the numerical sequence $\{g_n\}$ by linear conversion of "$g_n$=nT·O(nT)" where n is an integer.

STEP 103: A compute portion of the linear prediction conversion portion 3 generates the numerical sequence $\{p_i\}$. The numerical sequence $\{p_i\}$ which satisfies equation (7) is obtained from the numerical sequence $\{g_n\}$ obtained in STEP 102.

$$g_n + p_1 g_{n-1} + p_2 g_{n-2} + \ldots + p_n g_{n-N} = 0 \qquad (7)$$

Here, N is the same value as the number of units of the hidden layer 12. The methods of solving the numerical sequence $\{p_i\}$ as a linear predictive problem are the covariance method and the self-correlation method. Each of these methods will be described later.

STEP 104: The first learning results calculation portion 61 solves the compound algebraic equation having N dimensions and which is equation (8) from the numerical sequence $\{p_i\}$ obtained in STEP 103 and determines the solution $\{z_i\}$.

$$X^N + p_1 X^{N-1} + p_2 X^{N-2} + \ldots + p_N = 0 \qquad (8)$$

Equation (8) can be solved accurately and at high speed by the DKA method (Durand-Kberth Method).

STEP 105: The first learning results calculation portion 61 then uses the solution $\{z_i\}$ to determine the parameter $\{v_i\}$ from equation (9).

$$v_i = a^{-1}(\log(Z_i)), (a^{-1}: \text{differential operator}) \qquad (9)$$

In this manner, the approximation function $\phi$ ($v_i$,x) is determined from the determined parameter $v_i$.

STEP 106: The second learning results calculation portion 62 uses the method of least-squares so that the synapse weight from the hidden layer 12 to the output layer 13 gives a minimum error in the output data from the approximation function $\phi$ ($v_i$,x) with respect to the teaching patterns f(x).

The following is an example of the finding of a linear operator which satisfies equation (6) in STEP 101.

The first example uses an identity operator as the linear operator O when the approximation function $\phi$ ($v_i$, x) is the exponential function exp ($v_i$, x).

In addition, when the approximation function $\phi$ ($v_i$, x) is G(x−$v_i$)(where G is an arbitrary function type), a Fourier transformation or a Laplace transformation are used as the linear operator O. In actuality, the linear operator O becomes $$O \cdot \phi (v_i, x) = (O \cdot G)(x) \cdot \exp(j v_i, x)$$

and so the condition of equation (14) is satisfied.

The arbitrary function type G(x−$v_i$) is includes an extremely large number of types of neural networks. For example, an approximation according to the RBF (Radial Basis Function), that is, an approximation by an exponential type function exp ($-\|x-v_i\|^2$) as follows, $$f(x) = \Sigma c_i \exp(-\|x-v_i\|^2)$$

or an approximation by a step function $\Theta(x-v_i)$ as follows $$f(x) = \Sigma c_i \theta (x-v_i)$$

or the like, all relate to examples of linear operators and use a Fourier transformation or a Laplace transformation as the linear operator O.

In addition, even when the approximation function $\phi$ ($v_i$,x)(=$\phi$ ($w_i$ x+$\theta_i$), a Fourier transformation or the like is used as the linear operator.

$$\phi (w_i x+\theta_i) = \tan^{-1}(w_i x+\theta_i) \qquad (10)$$

The following is a description of the method of solving a linear predictive problem in STEP 103.

This method of solution is known but the following is a simple description which shows that the processing procedures are actually possible.

First, the problem will be considered as a linear predictive problem (linear regression analysis) of N dimensions, as shown by the numerical sequence $\{p_i\}$ i=0,1, . . .

$$g_n + p_1 g_{n-1} + \ldots + P_N g_{n-N} = \epsilon_n \qquad (11)$$

Here, the error E is defined as follows.

$$E = \sum_{n=t0}^{ti} |\epsilon_n|^2 \qquad (12)$$

$$= \sum_{n=t0}^{ti} \left| \sum_{i=0}^{N} p_i g_{n-i} \right|^2$$

$$= \sum_{n=t0}^{ti} \sum_{i=0}^{N} \sum_{j=0}^{N} p_i * p_j g_{n-i} * g_{n-j}$$

$$c_{ij} = \sum_{i=0}^{t1} p_{n-i} * p_{n-j}; c_{ij}* = c_{ij} \qquad (13)$$

("j" is number of the hidden layers)

and equation (14) is obtained by equation (13)

$$E = \sum_{i=0}^{N} \sum_{j=0}^{N} c_{ij} p_i * p_j \qquad (14)$$

The error E is two dimensional for the numerical sequence $\{p_i\}$ and so the error E with respect to the teaching patterns of the output data is determined so that it is minimum. More specifically, if each element of the numerical sequence $p_i$ is made "$r_i$+sqrt (−1)$h_i$" then the error is characterized by equation (15).

$$\partial E/\partial r_i = \partial E/\partial h_i = 0 \qquad (15)$$

When the term $c_{ij}$ shown in equation (13) is "$a_{ij}$+sqrt (−1) $b_{ij}$", the solving of the simultaneous equations of equations (16) determines the numerical sequence $\{p_i\}$.

$$\begin{vmatrix} a_{11} & a_{1N} & -b_{11} & -b_{1N} \\ a_{N1} & a_{NN} & -b_{N1} & -b_{NN} \\ b_{11} & b_{1N} & -a_{11} & -a_{1N} \\ b_{N1} & b_{NN} & -a_{N1} & -a_{NN} \end{vmatrix} \begin{vmatrix} r_1 \\ r_N \\ h_1 \\ h_N \end{vmatrix} = \begin{vmatrix} -a_{10} \\ -a_{N0} \\ -b_{10} \\ -b_{N0} \end{vmatrix} \qquad (16)$$

The equation (16) can be solved by the covariance or the self-correlation method. The covariance method is the method of selecting equation (19) with the optimized range ($t_0$,$t_1$) as (r, M−1). Self-correlation is the method of selecting the optimized range (−∞, +∞) as a value zero other than (0, M−1). The numerical sequence $\{p_i\}$ can be solved by either of these two methods.

In this manner, the present embodiment is a further development and generalization of the basic concept of learning so that it is applicable to learning using linear prediction. In the present embodiment, a linear operator O which satisfies equation (6) is found even when there is the appearance of a new function type as the function $\phi(v_i, x)$ which gives the neural network its characteristics, and the action of a linear operator on the teaching patterns f(x) enables learning to be always performed using linear prediction.

Accordingly, the processing of STEP 101 of the flow chart in FIG. 3 for the present embodiment described above returns the learning of the neural network NW to a linear predictive problem such as that from STEP 102 to STEP 104. Accordingly, for example, when the linear operator O is a Fourier transformation, the learning is returned to a linear predictive problem on a frequency axis.

Furthermore, when the learning is returned to a linear predictive problem, the number of units N of the hidden layer 12 is in agreement with the exponential of linear prediction. In addition, the coefficient (numerical sequence) $\{p_i\}$ of linear prediction is determined only by the parameter $v_i$ (synapse weight $w_i$, bias $\theta_i$) from the input layer to the hidden layer 12. The synapse weight $c_i$ input from the hidden layer 12 to the output layer 13 does not influence the series (numerical sequence) of linear prediction $\{p_i\}$. More specifically, linear prediction is used to obtain the parameter $v_i$ and the synapse weight $c_i$ from the input layer 11 to the hidden layer 12 and then the method of least-squares is used to determine the parameter $v_i$ separately.

Figure 4:
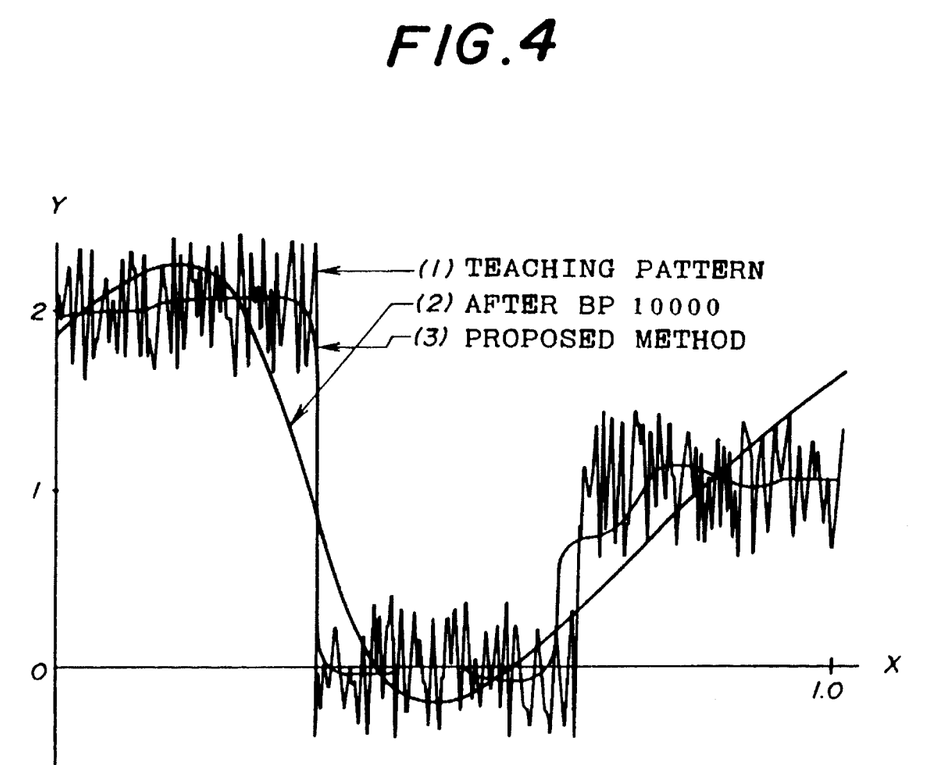
FIG. 4 is a view showing a comparison between the learning result of the present invention, and the conventional learning result.

Accordingly, unlike the conventional BP method which requires recursive calculation, with the present invention, it is possible to have the direct determination of the parameter and this enables the time required for learning to be greatly reduced. For example, the present embodiment is approximately 1,000 times faster than the conventional BP method. In addition, it is also possible to have efficient and accurate localized learning. As shown in FIG. 4, it is possible to faithfully determine the teaching patterns f(x) when compared to learning using the conventional BP method. In FIG. 4, there is shown the case for (2) earning by the conventional BP method, while (3) shows the case (2) for direct learning by the present embodiment.

Furthermore, with the present embodiment it is possible for an understanding of the nature of a neural network to be mathematically obtained and so it is possible to easily understand which characteristics are being learned in the neural network.

In addition the number of units N of neurons of the hidden layer 12 is in agreement with the exponent of the linear prediction and so it is possible to automatically determined the number of units N of neurons of the hidden layer 12. More specifically, learning is performed when the number of units N of neurons of the hidden layer 12 is a certain value and when the remainder due which value is between the actual output value and output value of the linear prediction problem solution to linear prediction is not sufficiently small. This means that there is an insufficient number of units N of neurons of the hidden layer 12. Accordingly, the processing in this case increases the number of units N of neurons of the hidden layer 12 and repeats the linear prediction, and can determine the minimum number of units N of neurons of the hidden layer 12 necessary to repeat the operation until it becomes a value smaller than the remainder set beforehand. By this processing, the role of the hidden layer of a neural network becomes clear.

SECOND EMBODIMENT

The following is a description of a second embodiment.

The description of the second embodiment assumes that the Fourier transformation F has been found as the suitable linear operator O, and that the approximation function $\phi(v_i, x)$ is the function $\sigma$ of the form of equation (10) for the first embodiment.

The neural network structure of the present embodiment is also the same the first embodiment, with one unit comprising each of an input layer 11 and a output layer 13.

Figure 5:
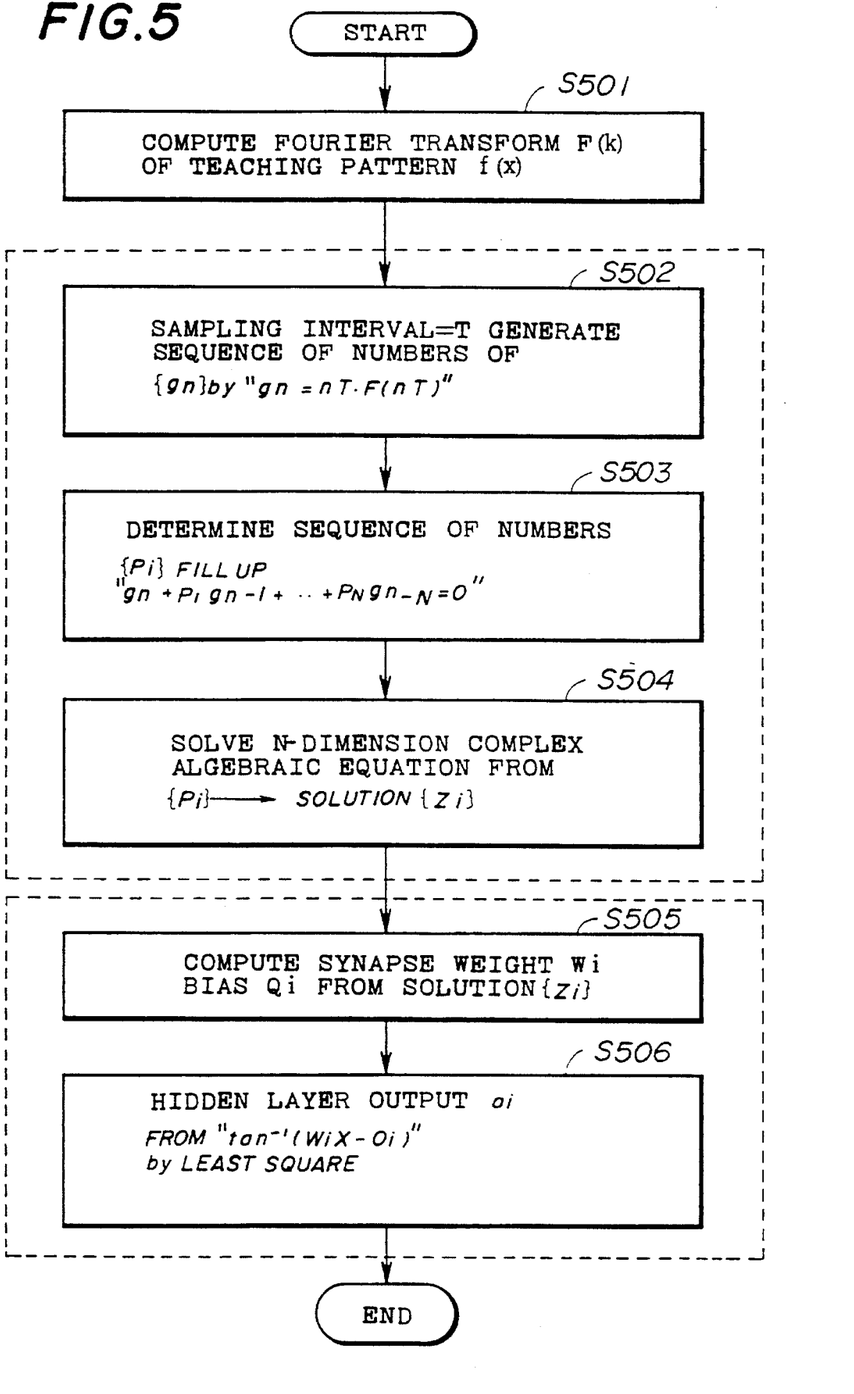
FIG. 5 is a flow chart of learning operation of a second embodiment of the present invention.

FIG. 5 shows the flow chart for the processing of a second embodiment according to the present invention, and is described below.

STEP 501: When the teaching patterns f(x) are given by $$f(x) = \Sigma\, c_i\, \phi\, (w_i x + \theta_i) \qquad (17)$$

the teaching patterns f(x) undergo Fourier transformation and F(k) is determined. The Fourier transformation F(k) is $$F(k) = \int f(x) \exp(i\, k\, x)\, dx \qquad (18)$$

STEP 502: A suitable sampling interval T is determined, and the numerical sequence $\{g_n\}$ is generated from "$g_n = nT \cdot F(nT)$", where n is an integer.

STEP 503: The numerical sequence $\{p_i\}$ which satisfies $$g_n + p_1\, g_{n-1} + p_2\, g_{n-2} + \ldots + p_N\, g_{n-N} = 0 \qquad (19)$$

is determined from the numerical sequence $\{g_n\}$ obtained in STEP 502. The exponent N is equal to the number of units in the hidden layer.

STEP 504: The N-dimensional compound algebraic equation $$x^N + p_1\, x^{N-1} + p_2\, x^{N-2} + \ldots + p_N = 0 \qquad (20)$$

from the numerical sequence $\{p_i\}$ of the linear predictive problem obtained in STEP 503 is solved to determine $\{z_i\}$. At this stage, the solution has no multiple-solution.

STEP 505: The synapse weight $w_i$ and the bias $\theta_i$ are determined from equations (21) and (22).

$$w_i = -T/\log |Z_i| \qquad (21)$$

$$\theta_i = \arg(Z_i)/\log |Z_i| \qquad (22)$$

where, "arg(x)" is the angle of eccentricity of the complex number x, and T is the sampling interval when the Fourier transformation results are dispersedly sampled when the Fourier transformation of the teaching patterns f(x) is returned to a linear predictive problem. $z_i$ is the solution to the linear predictive problem. When the parameters $w_i$ and $\theta_i$ are determined by the equations (21) and (22), the output $\phi(w_i + \theta_i)$ of the hidden layer 12 is determined from the calculations performed by equations (21) and (22).

Then, the synapse weight $c_i$ from the hidden layer 12 to the output layer 13 can be determine by the method of least squares so that the actual output data from the output layer 13 has a minimum error with respect to the teaching patterns f(x).

STEP 506: The output "$\sigma(w_i x + \theta_i)$" of the hidden layer is replaced with "$\tan^{-1}(w_i x + \theta_i)$" since the problem is linear predictive, and "$\tan^{-1}(w_i x + \theta_i)$" is determine from the bias $\theta_i$ and the synapse weight $w_i$ determined in STEP 505. Furthermore, from this solution, the synapse weight $c_i$ is determined by the method of least squares.

The processing in the flow chart described above first performs Fourier transformation for the teaching patterns f(x) given beforehand by equation (17). When this is done, the output $\phi(w_i x + \theta_i)$ from the hidden layer is replaced with a function type such as equation (23).

$$\phi(w_i x+\theta_i)=\tan^{-1}(w_i x+\theta_i) \quad (23)$$

The STEP 506 described above can be used to analytically solve the neural network learning problem by replacing the hidden layer output by equation (23). The form of "$\tan^{-1}(x)$" of equation (23) is very similar to the Sigmoid function which is normally used as the output function of a neural network and the use of this "$\tan^{-1}(x)$" does not change the performance of the neural network.

The Fourier transformation performed by the processing described above means that a Fourier transformation is used as the slowly increasing distribution function. The "$\tan^{-1}(x)$" and the sigmoid function cannot perform Fourier transformation in the sense of normal functions such as so the teaching patterns $f(x)$, and the output $\phi(w_i x+\theta_i)$ of the hidden layer are regulated by equation (22).

Fourier transformation is then performed for the teaching patterns $f(x)$ and the function $\phi(w_i x+\theta_i)$ and the learning for each of the parameters returns to a linear predictive problem on a frequency axis. Actually, it is possible to determine the parameters $w_i$, $\theta_i$ and $c_i$ by equations (21) and (22).

The following is a description of the theorem which enables the neural network learning of STEP 501~STEP 505.

The sigmoid function or "$\tan^{-1}(x)$" cannot perform Fourier transform. However, these function enable to perform Fourier transform when changes the sigmoid function or "$\tan^{-1}(x)$" to the slowly increasing distribution.

[DEFINITION 1]

The countable function $f(x)$ defined for real number is slowly increasing distribution, that is, positive constants value K and h satisfy the following formula.

$$|f(x)| \leq K \cdot (1+|x|^2)^h$$

[DEFINITION 2]

The increasing distribution is called slowly increasing distribution which is obtained by finite recursive differentiation.

[THEOREM 1]

The function $f(x)$ is a slowly increasing distribution with real value, and the Fourier transform of $f(x)$ is written $F(k)$. Three proposition ①, ②, ③ have the same values for $f(x)$ as a slowly increasing distribution.

The real number parameter group $\{a_i, w_i, \theta_i\}_{i=1\cdots N}$ exists in the propositions.

① The function $f(x)$ is shown as follows $$f(x) = \sum_{i=1}^{N} a_i \tan^{-1}(w_i x + \theta_i) \quad \text{I}$$

using the synapse weight $a_i$ from the input layer to the hidden layer, the synapse weight $w_i$ from the hidden layer to the output layer, and the bias $\theta_i$ $((w_i, \theta_i) \neq (w_j, \theta_j))$.

② When "$F(k) \equiv \int f(x) \exp(ikx) dx$" is the Fourier transform of the function $f(x)$, "$k F(k)$" is shown as follows $$kF(k) = \sum_{i=1}^{N} c_i \exp(d_i k) \quad \text{II}$$

using the synapse weight $c_i$ from the hidden layer to the output layer, complex number $d_i$ ($d_i \neq d_j$).

③ When "$F(k) \equiv \int f(x) \exp(ikx) dx$" is the Fourier transform of the function $f(x)$, then "$g_n \equiv nT \cdot F(nT)$"

(n is integer, T is unlimited constant), and the sequence of numbers $\{p_1, p_2, \ldots, p_N\}$ satisfies the following formula, $$g_n + p_1 g_{n-1} + p_2 g_{n-2} \cdots + p_N g_{n-N} 0 \quad \text{III}$$

Now, the N-dimension complex algebraic equation $$x^N + p_1 x^{N-1} + p_2 x^{N-2} + \ldots + p_N = 0 \quad \text{IV}$$

does not have multiple roots.

[End of theorem]

[THEOREM PROOF]

Theorem proving between proposition ① and the theorem of proposition ②:

It is known that the Fourier transform of $\tan^{-1}(w_i x + \theta_i)$ is $$j(\pi/2)^{1/2} \cdot \exp[-k\{(1+j\theta)/w\}]/k \quad \text{V}$$

which has the form shown in proposition ②.

Theorem proving of proposition ② to the theorem of ③:

If the solution $Z_i$ which solution of the N-dimension complex algebraic equation, define $Z_i = \exp(d_i T)$, then the following formula VI is determined from the formula II $$g_n = \sum_{i=1}^{N} c_i Z_i^n \quad \text{VI}$$

Furthermore, in the polynomial $S(x)$ is defined with the expansion coefficient $p_i$, $$\begin{aligned} S(x) &\equiv (x-Z_1) \cdot (x-Z_2) \ldots (x-Z_N) \\ &= x^N + p_1 x^{N-1} + p_2 x^{N-2} + \ldots + p_N \end{aligned} \quad \text{VII}$$

and then the following is computed $$p_1 g_{n-1} + p_2 g_{n-2} + \ldots + p_N g_{n-N} = \sum_{m=n-N}^{N-1} p_{n-m} g_m \quad \text{VIII}$$

and the formula VI is substituted in formula VIII, $$\begin{aligned} \sum_{m=n-N}^{n-1} p_{n-m} g_m &= \sum_{m=n-N}^{n-1} p_{n-m} \left\{ \sum_{i=1}^{N} c_i Z_j^m \right\} \\ &= \sum_{i=1}^{N} c_i \left\{ \sum_{m=n-N}^{n-1} p_{n-m} Z_i^m \right\} \\ &= \sum_{i=1}^{N} c_i \left\{ \sum_{m=n-N}^{n-1} p_{n-m} Z_i^{N-n+m} \right\} \cdot \\ & Z_i^{n-N} \end{aligned}$$

then using the formula VII $$= \sum_{i=1}^{N} c_i \{S(Z_i) - Z_i^N\} \cdot$$

$$Z_i^{n-N}$$

when using the formula VI $$= -\sum_{i=1}^{N} c_i Z_i^n = -g_n \quad \text{IX}$$

accordingly, the formula V is proved by the formula IX. Thus, according to the above demonstration is the confirmed relation between coefficients $p_1, p_2, \ldots, p_N$ and a complex number $d_i$ (in equation II).

Theorem proving of the theorem of proposition ③ to the theorem of proposition ②:

The sequence of number satisfies the formula V which has just one solution, because if first term N in dimension is fixed, then, the remaining term is fixed too. Thus, no matter what initial values are given to generate the sequence of numbers, this process can solve the weight $c_i$ from the output layer. For solving the output value $c_i$, it should be proved that the next matrix has inverse matrix.

$$\begin{vmatrix} 1 & 1 & 1 & 1 \\ z_1^1 & z_2^1 & z_3^1 & z_4^1 \\ z_1^2 & z_2^2 & z_3^2 & z_4^2 \\ z_1^{N-1} & z_2^{N-1} & z_3^{N-1} & z_4^{N-1} \end{vmatrix}$$

The matrix is given a determinant by the $\Pi_{i>j}(Z_i-Z_j)$ (determinant of Vandermonde), next equation does not have multiple solution, therefore, $$x^N + p_1 x^{N-1} + p_2 x^{N-2} + \ldots + p_N = 0$$

this equation does not have multiple solution. And this matrix is not zero.
[End of proof]

THIRD EMBODIMENT

With the first and second embodiments, the description was given for the case where the units of the hidden layer 12 consisted of N units and where a neural network input layer 11 and an output layer 13 each consisted of one unit. The following will describe the case where there are a plural number of units in the input layer 11, and will be description of a third embodiment.

With the first embodiment, the approximation function $\phi (v_i, x)$ is the function $\sigma$ of the type of equation (9) and the description was given on the assumption that the Fourier transformation F has been found as a suitable linear operator O.

When the input layer 11 has N number of units, the teaching patterns $f(x_1, x_2, x \ldots, x_n)$ are assumed to be given by equation (24).

$$f(x_1, x_2, \ldots, x_N) = \sum_{i=1}^{N} c_i \sigma(w_i^1 x_1 + \ldots + w_{iN} x_N + \theta_i) \quad (24)$$

In this case, the Fourier transformation $F(k_1, k_2, \ldots k_N)$ of the teaching patterns $f(x_1, x_2, x \ldots, x_n)$ become as shown by equation (25) and since there is plural input, is a collection of a plural number of straight lines. Moreover, in equation (25), the function $\rho$ is a Fourier transformation of the function $\sigma$.

$$F(k_1, k_2, \ldots, k_N) = (2\pi)^{N/2} \times \quad (25)$$

$$\sum_{i=1}^{N} c_i \rho(k_1/w_i^1) \cdot \exp(-j(k_1/w_i^1)\theta_i) \times$$

$$\delta(k_2 - (w_i^2/w_i^1)k_1) \times \delta(k_3 - (w_i^3/w_i^1)k_1) \times \ldots \times$$

$$\delta(k_N - (w_i^N/w_i^1)k_1)$$

The Fourier transformation of a function such as equation (25) becomes "0" for other than combinations of straight lines such as equation (26) and which pass through the origin.

$$\bigcup_{i=1}^{N} \{k_1, k_2, \ldots, k_N\} : k_1/w_i^1 = k_2/w_i^2 = k_3/w_i^3 = \ldots = k_N/w_{in}\} \quad (26)$$

The Fourier transformation of the given function is used for the ratio of the synapse weight to be determined after the straight lines of equation (26) have been determined.

$$w_i^1 : w_i^2 : w_i^3 : \ldots : w_i^N$$

The ratio of the synapse weight does not influence the shape of the function $\sigma$. More specifically, the shape of the function $\sigma$ is necessary to determine the value of the synapse weight $w_i^1$, but the value of this ratio is not influenced by the function $\sigma$, and is a constant quantity.

The determination of the straight lines as in equation (27) regards the function $|F(k_1, k_2, \ldots k_N)|$ as an image of N dimensions, and the straight lines which pass through the origin can all be determined. On each of the straight lines, the solution of equation (27) enables the function $|F(k_1, k_2, \ldots k_N)|$ to be returned to a one dimensional problem.

$$F(k_1, k_2, \ldots, k_N) = (2\pi)^{N/2} \times \quad (27)$$

$$\sum_{i=1}^{N} c_i \rho(k_1/w_i^1) \exp(-j(k_1/w_{1_i})\theta_i)$$

According to this method, even if the input layer 11 is comprised of a plural number of units, it is possible for there to be return to the same form as the case for solving the linear predictive problems of the first and second embodiments of which the input layer 11 comprises only a single unit, and the synapse weights $w_i$ and the bias $\theta_i$ to be determined.

When the neural network has a plural number of input layer's units, and one output layer unit, learning by arbitrary non-linear function $\sigma(x)$ is returned to the straight lines applying within the multiple dimension space and first dimension of the first embodiment. Accordingly, if function $\sigma p$ is used as the non-linear function when the input layer has a plural number of units, a connection weight and bias can be directly determined.

Figure 6:
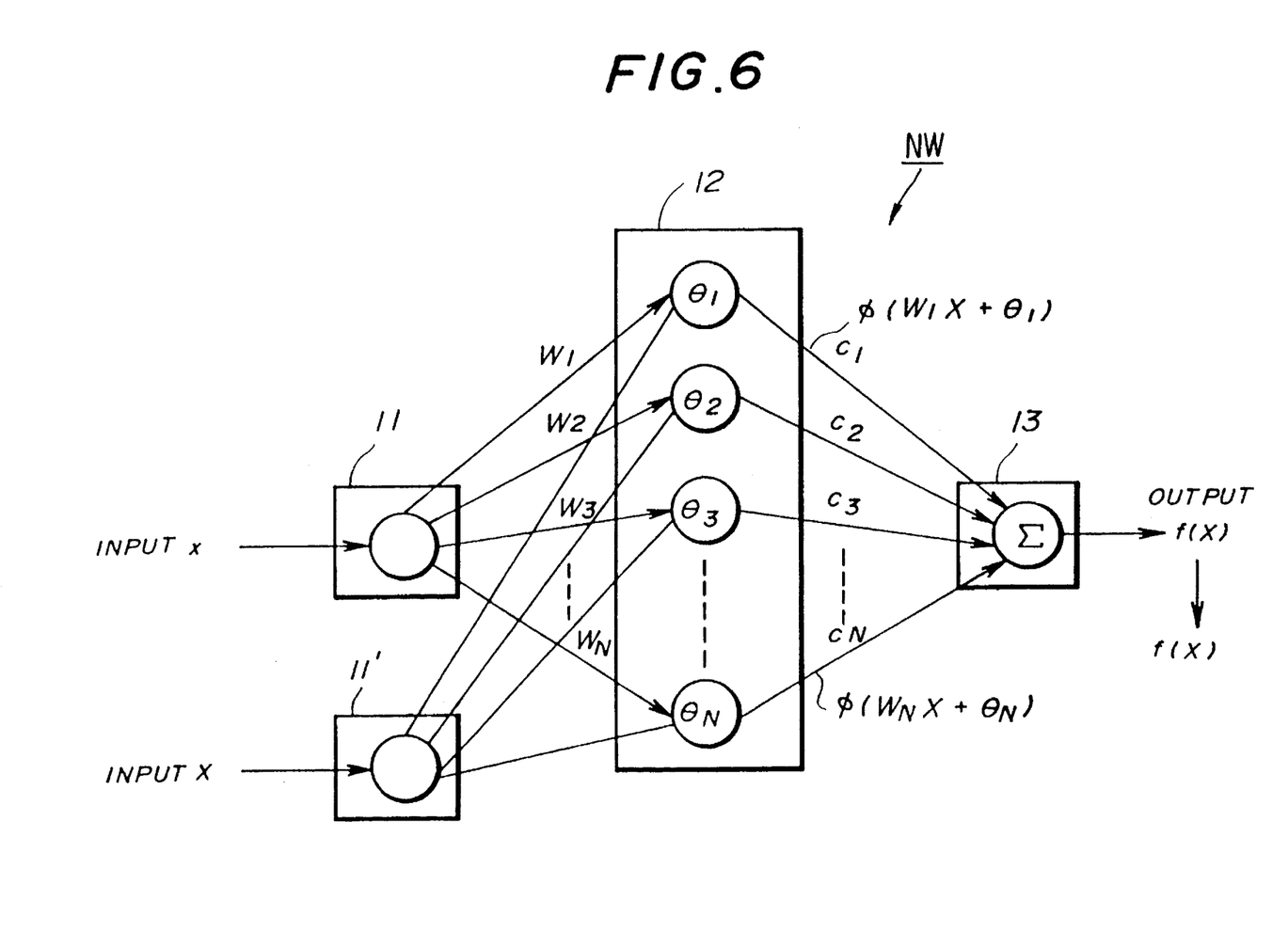
FIG. 6 is a view showing the constitution of a multi-layer perceptron neural network having three or more layers.
Figure 7:
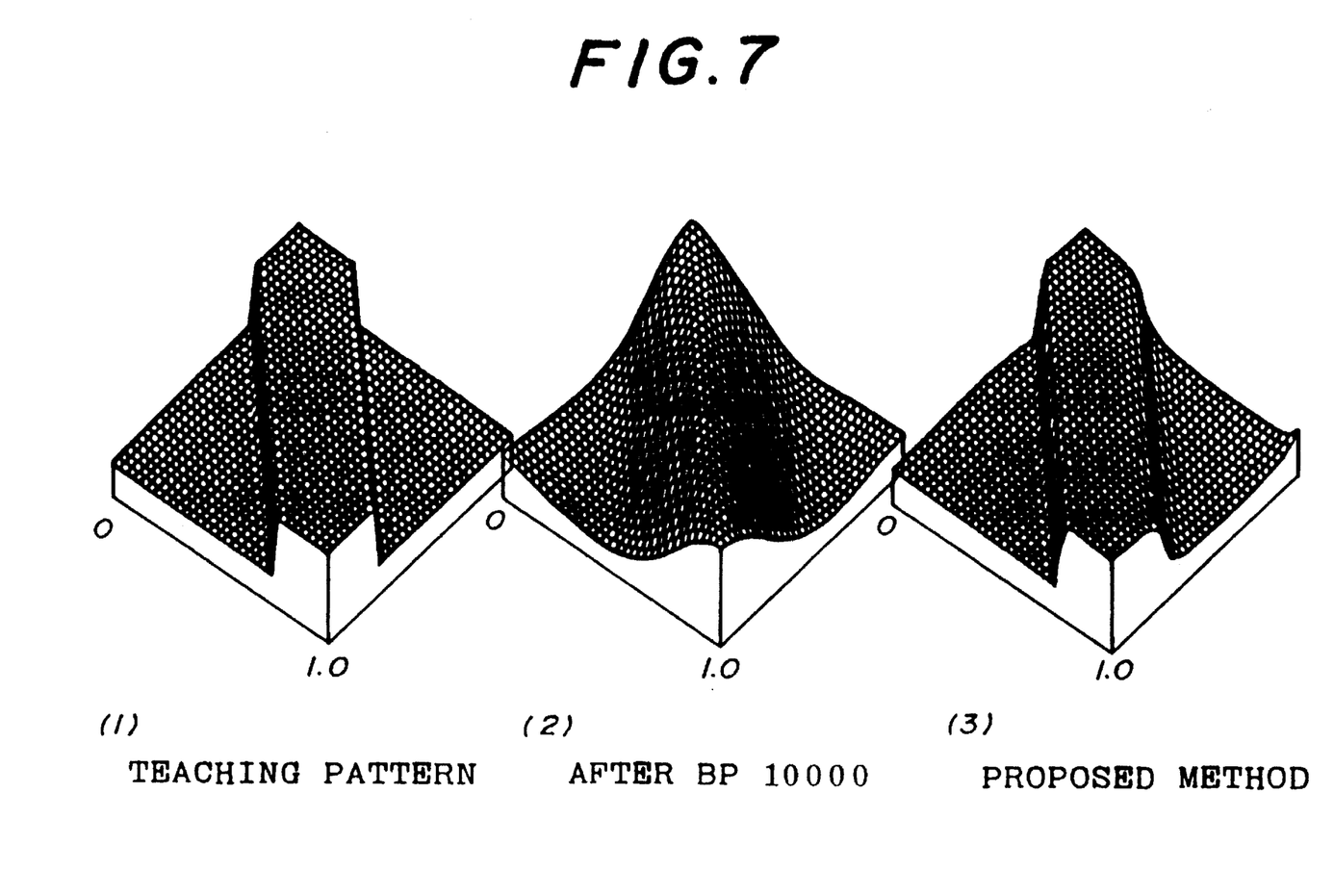
FIG. 7 is a view showing result of the simulation of the present invention and the conventional learning method.

Furthermore, although it is not possible to have a solution using by a two-layer perceptron, a three-layer perceptron is able to solve exclusive logical sum problem. FIG. 6 shows the neural network constitution of a multi-layer perceptron having three or more layers. FIG. 7 shows the results obtained. In FIG. 7, (1) shows the teaching patterns, and (2) shows the results of learning for 10,000 times by the conventional BP method, and (3) is the results of learning by the learning method of the present invention. In this case, the number units in the of hidden layer is five.

As is clear from the results shown in FIG. 7, when compared to the conventional learning method, it it possible to extract the teaching patterns more faithfully when the learning method of the present invention is used. In addition, whereas the conventional learning method took a total of several hours, only a few second are taken with the learning method according to the present invention.

The present invention is not limited to the embodiments described above, as various modifications and improvements are still possible within the range of the present invention.

What is claimed is:

1. An apparatus, comprising:
   a neural network of the function approximation type having an input layer, a hidden layer and an output layer;

an operation means for determining a linear operator, which satisfies a predetermined equation containing a predetermined approximation function of said neural network for learning by using linear prediction, and for mathematically combining said linear operator with a teaching pattern which is approximated by a linear sum of said predetermined approximation function to determine mathematical combining results;

a linear prediction means for replacing learning of the neural network with a linear predictive problem according to said mathematical combining results obtained by said operation means, and for determining a solution with respect to said linear predictive problem; and a learning means for determining weights from said hidden layer to said output layer so that an error between output data from said output layer and said teaching pattern is minimized using said solution.

2. The apparatus as claimed in claim 1, wherein said operating means determines said linear operator so that a mathematical combination of said linear operator and said predetermined approximation function is equal to a function including an exponential function having a varying independent variable as an exponent.

3. The apparatus as claimed in claim 2, wherein said operation means determines said linear operator as an identity operator.

4. The apparatus as claimed in claim 2, wherein said linear prediction means comprises:

means for determining a sampling interval for sampling said mathematical combining results for replacing said mathematical combining results with a linear predictive problem;

means for sampling said mathematical combining results at said determined sampling interval;

a replacing means for replacing said sampled mathematical combining results with said linear predictive problem;

determining means for determining one of a differential equation and an integral equation with respect to said linear predictive problem; and means for solving said linear predictive problem using said one of said differential equation and said integral equation.

5. The apparatus as claimed in claim 4, wherein said means for solving solves said linear predictive problem and determines a number of units of said hidden layer using a covariance method.

6. The apparatus as claimed in claim 4, wherein said means for solving solves said linear predictive problem and determines a number of units of said hidden layer using a self-correlation method.

7. The apparatus as claimed in claim 1, wherein said operation means determines said linear operator to be a Fourier transformation.

8. The apparatus as claimed in claim 7, wherein said predetermined approximation function is a Radial Basis Function.

9. The apparatus of claim 7, wherein said predetermined approximation function is a step function.

10. The apparatus as claimed in claim 1, wherein said learning means comprises:

a first learning means which uses the solution of the linear predictive problem determined by said linear prediction means to determine a weight from said input layer to said hidden layer using said solution determined by said linear prediction means; and a second learning means which uses said weight from said input layer to said hidden layer to determine the weight from said hidden layer to said output layer so that an error between said teaching pattern and output data is minimized using said determined weight from said input layer to said hidden layer.

11. The apparatus as claimed in claim 10, wherein said first learning means determines an output from said hidden layer using "$\tan^{-1}(x)$".

12. The apparatus as claimed in claim 10, wherein said first learning means determines an output from said hidden layer using the least-squares method.

13. The apparatus as claimed in claim 10, wherein said first learning means determines the weight from said input layer to said hidden layer independently of the weight from said hidden layer to said output layer.

14. The apparatus as claimed in claim 1, wherein said linear prediction means sets a number of linear predictive dimensions used for said determining of said solution determined by the linear prediction means equal to a number of units of said hidden layer of the neural network.

15. A learning apparatus, comprising:

a functional approximation type neural network having an input layer, a hidden layer and an output layer;

a first means for determining a Fourier transformation of given teaching patterns;

a second means for determining an arbitrary sampling interval and generating a first numerical sequence obtained from linear conversion of a mathematical combination including said Fourier transformation;

a third means for determining from said first numerical sequence, a second numerical sequence which satisfies a linear predictive equation;

a fourth means for determining a solution to an N-dimensional algebraic equation using coefficients from said second numerical sequence, wherein N is an integer;

a fifth means for using "$\tan^{-1}(x)$" to determine a coupling weight from said input layer to said hidden layer and calculating a bias; and a sixth means for determining a coupling weight from said hidden layer to said output layer from results of said fifth step and using the least squares method.

16. An apparatus, comprising:

a multi-layer perception neural network having three or more layers;

means for fitting a straight line passing through an origin to a Fourier transformation of a problem to obtain a quantity which is linear predictive, when a dimension of input data is two or more; and means for performing learning using the fitted Fourier transformation.

17. An apparatus, comprising:

a neural network of the function approximation type having an input layer, a hidden layer and an output layer;

an operation means for determining a linear operator, which satisfies a predetermined equation containing a predetermined approximation function of said neural network for learning by using linear prediction, and for mathematically combining said linear operator with a teaching pattern which is approximated by a linear sum of said predetermined approximation function to determine mathematical combining results;

a linear prediction means for replacing learning of the neural network with a linear predictive problem according to said mathematical combining results obtained by said operation means, and for determining a solution with respect to said linear predictive problem represented by a parameter $v_i$ of an approximation function of the neural network; and a learning means for determining a parameter $c_i$ of the neural network which indicates weights from said hidden layer to said output layer so that an error between output data from said output layer and said teaching pattern is minimized using said solution;

wherein i is an integer index ranging from 1 to N, N being a number of neurons of the hidden layer;

wherein $v_i$ is a generalized representation of a synapse weight from the input layer to the hidden layer; and wherein $c_i$ is a synapse weight from the hidden layer to the output layer.

18. A learning method for a functional approximation type neural network having an input layer, at least one hidden layer and an output layer, comprising:

a first step for determining a linear operator, which satisfies a predetermined equation containing a predetermined approximation function of said neural network for learning by using linear prediction, and for mathematically combining said linear operator with a teaching pattern which is approximated by a linear sum of said predetermined approximation function to determine mathematical combining results;

a second step for replacing learning of the neural network with a linear predictive problem according to said mathematical combining results determined by said first step, and for determining a solution with respect to said linear predictive problem; and a third step for determining weights from said at least one hidden layer to said output layer so that an error between output data from said output layer and said teaching pattern is minimized using said solution.

19. The learning method as claimed in claim 36, wherein said first step determines said linear operation so that a mathematical combination of said linear operator and said predetermined approximation function is equal to a function including an exponential function having a varying independent variable as an exponent.

20. The learning method as claimed in claim 19, wherein said first step determines said linear operator as an identity operation.

21. The learning method as claimed in claim 19, wherein said second step comprises the sub-steps of:

determining a sampling interval for sampling said mathematical combining results for replacing said mathematical combining results with a linear predictive problem;

sampling said mathematical combining results at said determined sampling interval;

replacing said sampled mathematically combining results with said linear predictive problem;

determining one of a differential equation and an integral equation with respect to said linear predictive problem; and solving said linear predictive problem using said one of said differential equation and said integral equation.

22. The learning method as claimed in claim 21, wherein said solving sub-step solves said linear predictive problem and determines a number of units of said at least one hidden layer using a covariance method.

23. The learning method as claimed in claim 21, wherein said solving sub-step solves said linear predictive problem and determines a number of units of said at least one hidden layer using a self-correlation method.

24. The learning method as claimed in claim 18, wherein said first step determines said linear operator to be a Fourier transformation.

25. The learning method as claimed in claim 24, wherein said predetermined approximation function is a Radial Basis Function.

26. The learning method of claim 24, wherein said predetermined approximation function is a step function.

27. The learning method as claimed in claim 18, wherein said third step comprises the sub-steps of:

determining a weight from said input layer to said at least one hidden layer which is included in said predetermined approximation function using said solution determined in said second step; and determining a weight from said at least one hidden layer to said output layer so that an error between said teaching pattern and said output data is minimized using said determined weight from said input layer to said at least one hidden layer.

28. The neural network learning method as claimed in claim 27, wherein said sub-step of determining the weight from said at least one hidden layer to said output layer comprises:

terminating said determining when said error is less than a predetermined value as the result of performing learning, and increasing a number of units of said at least one hidden layer and linear predictive dimension, again determining a weight from said at least one hidden layer to said output layer so that an error between said teaching pattern and said output data is minimized, and repeating said increasing and again determining until said error is smaller than said predetermined value.

29. The neural network learning method as claimed in claim 27, wherein said sub-step of determining the weight from said input layer to said at least one hidden layer determines an output from said hidden layer using "$\tan^{-1}(x)$".

30. The learning method as claimed in claim 27, wherein said sub-step of determining the weight from said at least one hidden layer to said output layer uses the least squares method.

31. The learning method as claimed in claim 18, wherein said second step includes the sub-step of setting a number of linear predictive dimensions equal to a number of units of said at least one hidden layer.

32. A learning method for a functional approximation type neural network having an input layer, a hidden layer and an output layer, comprising:

a first step for determining a Fourier transformation of given teaching patterns;

a second step for determining an arbitrary sampling interval and generating a first numerical sequence obtained from linear conversion of a mathematical combination including said Fourier transformation;

a third step for determining from said first numerical sequence, a second numerical sequence which satisfies a linear predictive equation;

a fourth step for determining a solution to an N-dimensional algebraic equation using coefficients from said second numerical sequence, wherein N is an integer;

a fifth step for using "$\tan^{-1}(x)$" to determine a coupling weight from said input layer to said hidden layer and calculating a bias; and a sixth step for determining a coupling weight from said hidden layer to said output layer from results of said fifth step and using the least squares method.

33. A neural network learning method for use with multilayered perceptrons having three or more layers, comprising the steps of:

fitting a straight line passing through an origin to a Fourier transformation of a problem to obtain a quantity which is linear predictive, when a dimension of input data is two or more; and performing learning using the fitted Fourier transformation.

* * * * *